United States Patent [19]

Cuylits et al.

[11] 4,454,819

[45] Jun. 19, 1984

[54] SYSTEM FOR AUTOMATICALLY GUIDING A VEHICLE PROVIDED WITH TIRED WHEELS

[75] Inventors: Jacques Cuylits, Brussels; Paul Lenssen, Varsenare; Philippe P. Chatelle, Brussels, all of Belgium

[73] Assignee: S.A. Constructions Ferroviaires et Metalliques, Brussels, Belgium

[21] Appl. No.: 363,735

[22] Filed: Mar. 30, 1982

[30] Foreign Application Priority Data

Apr. 2, 1981 [LU] Luxembourg ............................ 83276

[51] Int. Cl.³ ............................................. B61F 9/00
[52] U.S. Cl. .................................... 104/245; 104/242; 105/215 C
[58] Field of Search ................... 104/118, 242, 244.1, 104/245; 105/215 R, 215 C; 180/131; 280/776

[56] References Cited

U.S. PATENT DOCUMENTS 2,468,158 4/1949 Bartholomew ............... 104/242 UX
2,925,875 2/1960 Bourdon ........................ 104/245 X

FOREIGN PATENT DOCUMENTS

1131358 2/1957 France ................................ 104/245
651744 1/1963 Italy .................................. 104/244.1
1127951 9/1968 United Kingdom ............. 104/244.1

*Primary Examiner*—Randolph Reese
*Attorney, Agent, or Firm*—Sughrue, Mion, Zinn, Macpeak & Seas

[57] ABSTRACT

A system for automatically guiding a vehicle provided with pneumatically tired wheels comprises first and second rollers 7, 7' which follow a rail 8 extending in the path of movement of the vehicle. The first roller is supported by a fork-shaft 9, 10 extending in the direction of movement of the vehicle and capable of oscillating vertically about a horizontal axis 11. It is fastened to a turret 12 connected to at least one coupling bar 17 hinged to a steering lever 6. The second roller is supported by a second support arm extending in the opposite direction, which may also oscillate vertically about a horizontal axis and pivot horizontally independently of the turret, to a limited extent. The vehicle can be guided alternately either by a mechanical type of automatic system, used when the vehicle moves on an appropriate infrastructure, or manually by the driver, when the vehicle moves autonomously.

17 Claims, 16 Drawing Figures

SYSTEM FOR AUTOMATICALLY GUIDING A VEHICLE PROVIDED WITH TIRED WHEELS

BACKGROUND OF THE INVENTION

A system for automatically guiding vehicles is known from French Pat. No. 1,131,357, the wheels of the vehicles being provided with pneumatic tyres, comprising control means which act on each of the steering levers of the wheels, and also comprising means for raising the above-mentioned control means and disengaging them from a rail, in view of guiding the vehicle in a manner other than by the rail.

This known system has the disadvantage of being unidirectional, i.e., it cannot be used in the two directions of movement.

It also has the disadvantage of not being able to prevent an excessive drift of wheels having pneumatic tires, nor being able to prevent said wheels from slipping. The safety is reduced because the system does not comprise any means for making the vehicle exactly follow the provided trajectory.

A bi-directional automatic guiding system for rigid or articulated vehicles is also known from French Pat. No. 1,131,358, the system being provided with at least one steering axle supporting wheels with pneumatic tires, possibly driving wheels, comprising at least one first roller which is to follow a rail extending in the longitudinal axis of the movement path of the vehicle, or parallel to this axis. Each roller is mounted on an arm comprising two rods each being hinged on the side of a small vertical shaft which transmits the steering pulse to a steering lever of the guide wheels of the vehicle.

This known guidance system does not allow any transverse digression of the axle and wheels with respect to the provided trajectory. Any drift, even a normal drift of wheels with pneumatic tires subjects the two rollers and the rail to transverse stresses when the rollers are attached together rigidly by the pairs of rods.

Consequently, the wheels with pneumatic tires only have a supporting function and not a transverse positioning function.

The effect of a parallelogram-shaped assembly of the arms supporting the guiding rollers is to maintain the rotational axes of the rollers parallel to the axis of the axle body. Also, while being inscribed in the curves, the rollers form with the rail an angle of incidence which brings them to revolve under unfavorable wear and noise conditions. If the curve is very pronounced, the angle of incidence may become excessive and may considerably increase the risks of derailment.

This known system does not comprise any means for lifting the guiding device which would allow the use of bimodal type vehicles, i.e., the use of vehicles which are guided alternately, either by a mechanical type of automatic device used on its appropriate infrastructure, or by the driver in an autonomous use.

SUMMARY OF THE INVENTION

It is an object of this invention to avoid said drawbacks of the known automatic guiding systems.

The present invention provides a bimodal type of system for automatically guiding a vehicle, provided with at least one steering axle supporting wheels having pneumatic tires, possibly driving wheels, comprising at least one first roller which is to follow a rail extending in the longitudinal axis of the movement path of the vehicle or parallel to this axis and supported by a support arm extending in the direction of movement of the vehicle with respect to the steering axle. This support arm is able to oscillate vertically about a substantially horizontal axis and is fastened to a turret mounted on a substantially vertical pivot supported by said steering axle or by the vehicle and connected to at least one coupling bar hinged to a lever for steering one of the wheels supported by the steering axle. At least one second roller is supported by a second support arm extending in the direction opposite the direction of movement of the vehicle with respect to the steering axle, this second arm also being able to oscillate vertically about a substantially horizontal axis. This second arm is fastened to the turret mounted on the above-mentioned pivot so that it is able to pivot horizontally about a substantially vertical axis, independently of said turret, to a predetermined extent.

In an embodiment of the device according to the present invention, the support arm of the second roller, extending in the direction opposite the direction of movement of the vehicle, is hinged to the turret by a substantially horizontal pivot supported by a crossbar which may pivot independently of the turret to a predetermined extent, about the substantially vertical pivot supported by the turret.

The automatic guiding system according to the present invention, as defined in the three preceeding paragraphs, is a unidirectional type of system, i.e., it only allows the vehicle to be automatically guided in a single direction of movement of the vehicle.

However, the guiding system according to this invention may also be a bi-directional type of system, i.e., it may be adjusted to allow the vehicle to be automatically guided in the two directions of movement thereof.

In the case of a bi-directional automatic guiding system according to the present invention, the first roller is fastened to the turret which is mounted on the pivot supported by the steering axle or by the vehicle, such that it is also able to pivot horizontally about a substantially vertical axis, independently of the turret, to a predetermined extent. The guiding system then comprises means for preventing one of the two support arms respectively supporting the first and second rollers, from pivoting horizontally about said substantially vertical axles separately from the pivot axis of the turret.

The means for preventing one of the two arms, respectively supporting the first and the second rollers, from pivoting horizontally preferably comprise a reversing lever hinged at one end to a trunnion supported by the turret and provided on each side with a boss which is capable of engaging in a seat provided in an extension of one of the crossbars which are each supported by a substantially horizontal pivot of each support arm, the above-mentioned reversing lever being operated by reciprocating motion means, in order to bring one of the bosses of said lever into the corresponding seat of the extension of one of the crossbars and to disengage the other boss.

The rollers are maintained in contact with the guiding rail by a suspension system, preferably by a double suspension system comprising two separate suspension elements which are each capable of separately maintaining the rollers in contact with the rail, for example a helical spring and a pneumatic device which are substantially coaxial.

The automatic guiding system according to the present invention also comprises means for lifting the support arms of the rollers. These means advantageously comprise a double-action lifting jack, comprising a cylinder mounted on the horizontal pivot of a support arm and a piston hinged at one end of a lever, the other end of which is hinged to an extension of the turret, respectively to the extension of the crossbar, and also comprising on each side of the support arm a cable, one end of which is attached to a support arm of a roller and the other end of which is attached to the above-mentioned lever on one side of the support arm and to a crank integral with the lever, on the other side of the support arm.

According to a complementary characteristic of this invention, the guiding system according to the invention comprises a guiding device which is different from the guiding rail and is capable of being manual, for example, this guiding device controlling the orientation of the vehicle wheels, for example by means of the turret or by means of one of the steering levers of the wheels, and it being possible for this device to be engaged or disengaged at will.

A peripheral groove is advantageously provided in the core of the roller, such that the rollers have on both sides of the groove a rolling strip on the guiding rail of the vehicle. This peripheral groove is to engage in a projection of the rail extending along the sections where the vehicle is to move in its appropriate site.

BRIEF DESCRIPTION OF THE DRAWINGS

In the drawings.

The same reference numerals in the different Figures designate identical or similar elements.

DETAILED DESCRIPTION OF THE PREFERRED EMBODIMENTS

Figure 1:
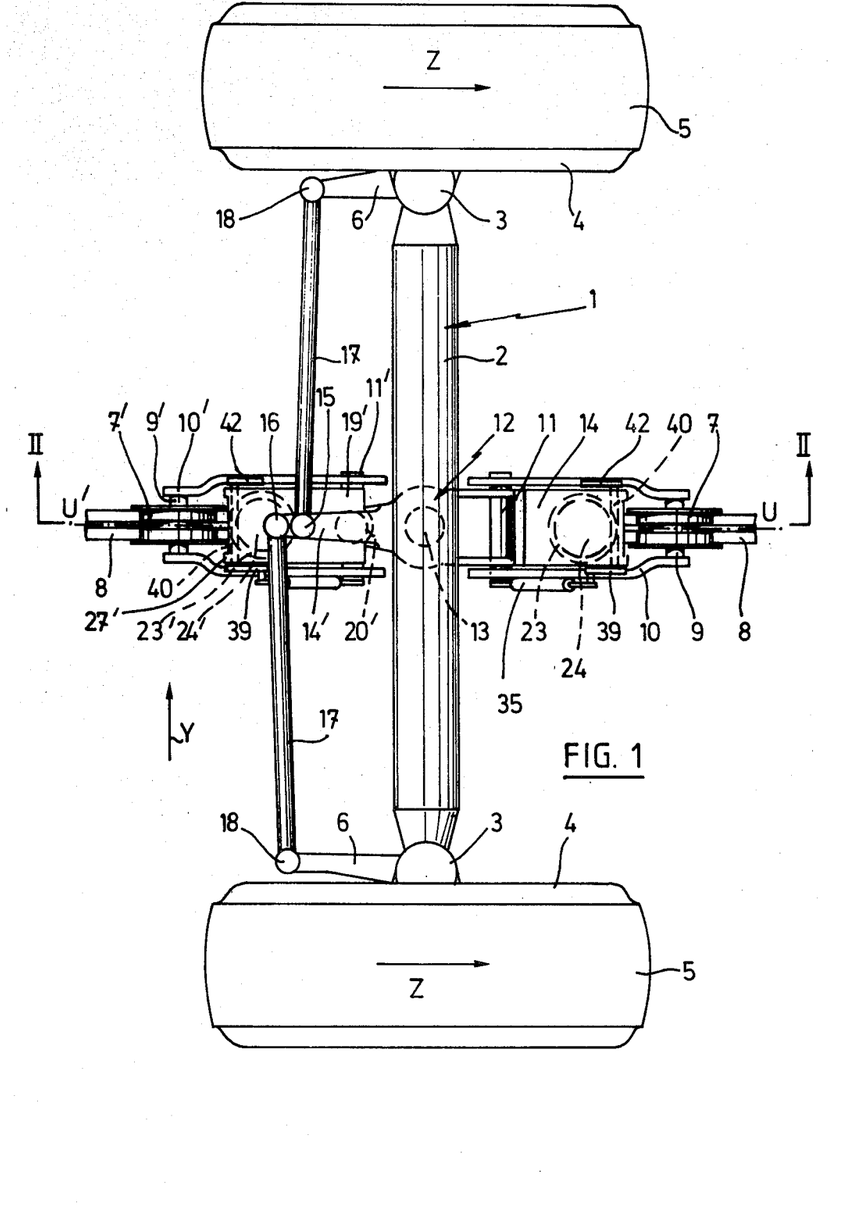
FIG. 1 is a plan view of a steering axle for wheels having pneumatic tires, provided with an automatic, unidirectional guiding system according to the present invention.
Figure 2:
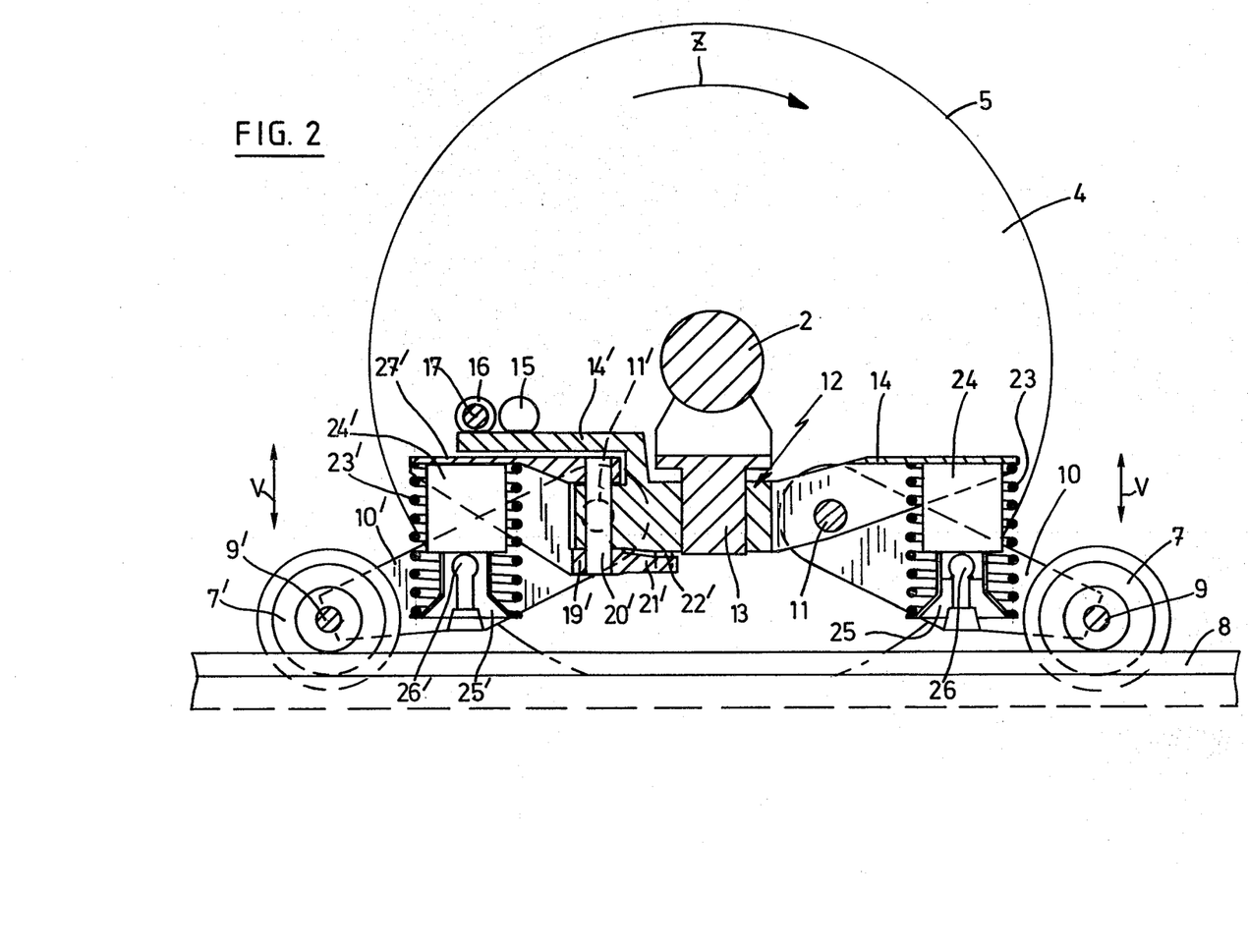
FIG. 2 is a section along line II—II of FIG. 1.
Figure 3:
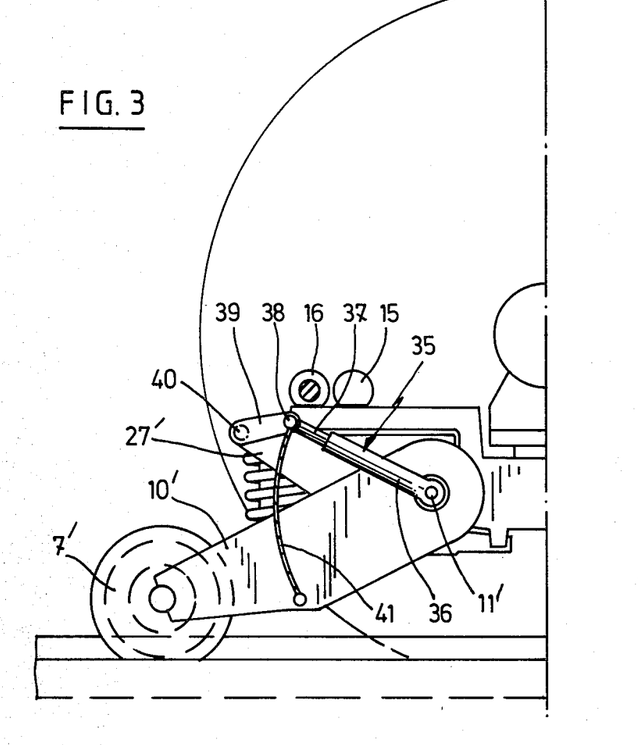
FIG. 3 is a side elevation view in the direction of arrow Y of FIG. 1.

FIGS. 1 to 3 illustrate a steering axle designated as a whole by reference numeral 1 and comprising a body 2 provided at each end with axle journals 3 for wheels 4 having pneumatic tires 5 to which steering levers 6 are attached. An automatic, unidirectional guiding system according to the present invention is mounted on this axle 1, comprising a roller 7 which is to be engaged on a rail 8 extending in the longitudinal axis U-U' of the movement path of a vehicle which is not shown.

This roller 7 is mounted on a shaft 9 supported by a support arm 10 which extends in the direction of movement of the vehicle, indicated by arrows Z, with respect to the steering axle 1. The support arm 10 may oscillate vertically according to the arrows V about a substantially horizontal pivot 11 which is supported by a turret designated as a whole by reference numeral 12, mounted on a pivot 13 which is attached on the body 2 of the steering axle 1. This pivot 13 which may be supported by the vehicle rather than by the axle 1 extends in a substantially vertical or oblique direction below the body 2 of the axle.

The pivot 11 of the arm 10 is in fact supported by a first extension 14 of the turret 12 which may have an inverted U-shaped cross section and is integral with this turret 12.

In the direction opposite the direction of movement of the vehicle, the turret 12 comprises a second extension 14' supporting swivel joints 15 and 16 which connect it to coupling bars or tie rods 17 which are hinged at 18 to the steering lever 6 of each wheel 5.

A crossbar 19' is fastened to the second extension 14' of the turret 12 by a substantially vertical pivot 20'.

A second support arm 10' is suspended by a substantially horizontal pivot 11' from the crossbar 19' and it extends in the direction opposite the direction of movement of the vehicle and supports the shaft 9' of a second roller 7'. This support arm 10' may thus oscillate vertically about the substantially horizontal pivot 11' in the same manner as the support arm 10. The support arm 10' may also pivot horizontally, independently of the turret 12, about the substantially vertical pivot 20' of the crossbar 19'.

The crossbar 19' has a lower appendage 21' restricting the horizontal pivoting of this crossbar 19' and of the support arm 10' to a predetermined extent between stops 22' supported by the turret 12 on both sides of the lower appendage 21' of the crossbar 19'.

To apply the rollers 7, 7' firmly against the rail 8, the support arms 10, 10' of the rollers 7, 7' are suspended respectively from the extensions 14 and 27' of the turret 12 and the crossbar 19' by a double suspension system comprising two separate suspension elements which comprise helical springs 23, 23' and pneumatic devices 24, 24'.

The helical spring 23 rests on one side on the first extension 14 of the turret 12 and, on the other side, on a shoulder 25 supported by an articulation device 26, such as a substantially horizontal pivot or a swivel joint, supported by the support arm 10, while the pneumatic device 24 also rests on the first extension 14 of the turret 12 and on the shoulder 25 supported by the articulation device 26 carried by the support arm 10 of the roller 7.

The helical spring 23' rests on one side on an extension 27' of the crossbar 19', supported by the extension 14' and, on the other side, on a shoulder 25' supported by an articulation device 26', such as a substantially horizontal pivot or a swivel joint, carried by the support arm 10' of the roller 7', while the pneumatic device 24' also rests on the extension 27' of the crossbar 19' and, by means of the shoulder 25', on the articulation device 26' carried by the support arm 10' of the roller 7'.

The helical spring 23 and the pneumatic device 24, likewise the helical spring 23' and the pneumatic device 24' are coaxial. These suspension systems ensure adequate guidance and contact of the rollers 7, 7' on the rail 8. The pressure of the pneumatic devices 24, 24' is adjusted, so that the pressure and the limit value of transverse hold of the rollers 7, 7' on the rail 8 is maintained substantially proportional to the total weight (tare +useful load) applied to each axle of the vehicle.

Figure 4:
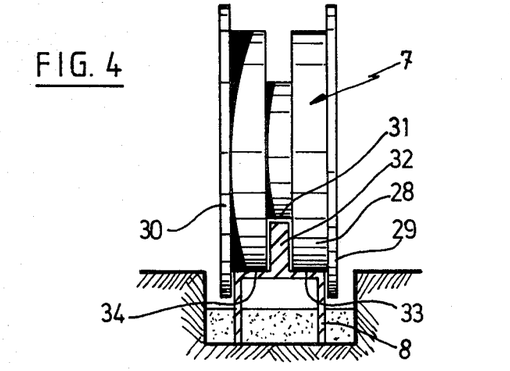
FIG. 4 illustrates a roller co-operating with a guiding rail.

As may be seen in FIGS. 1 and 4, each roller 7, 7' comprises a core 28 which is inserted between two flanges 29 and 30. A groove 31 made in the core 28 of each roller 7, 7' receives a projection 32 of the rail 8 when the vehicle circulates on its appropriate site. The core 28 of the rollers 7, 7' has on both sides of the groove 31 a rolling strip 33, 34, the function of which will be explained later on.

The guiding system which is partly illustrated in FIGS. 1 and 3 comprises means for lifting the support arms, for example for lifting arm 10'. These lifting means comprise a double-action lifting jack 35, comprising a cylinder 36 mounted on the pivot 11' of the support arm 10' and a piston 37 which is hinged at 38 to one end of a lever 39, the opposite end of which is hinged by means of a shaft 40 to the extension 27' of the crossbar 19', and on each side of the support arm 10' comprise a cable 41, one end of which is attached to the support arm 10' and the other is attached to the lever 39, on one side of the support arm 10', and to a crank 42 which is integral with the lever 39 by the shaft 40, on the other side of the support arm 10'.

The support arm 10' of the roller 7' may be raised by operating the jack 35, the piston 37 of which pivots the lever 39 and the crank 42 in an anti-clockwise direction (FIG. 3), in order to tighten the cables 41 which are curved in a slack position, and to thus raise the roller 7' and the support arm 10' thereof.

The arrangement of the raising elements of each support arm, for example of arm 10' is such that in a raised position, these elements occupy a stable position, even if a loss of hydraulic pressure occurs in the lifting jack 35. This stability is ensured by the rocking movement of the lever 39 and of the crank 42 beyond the position which tends to return them in clockwise direction (FIG. 3).

When the front roller 7 is engaged in the rail 8 for automatic guidance, it corrects the possible trajectory deviations of the steering axle 1 with respect to the guiding rail 8 and transmits them by a rotational movement to the support arm 10 which drives the turret 12.

The turret 12 communicates its orientation, bearing in mind the drift value of the pneumatic tires 5 to the steering levers 6 by the coupling bars 17 and the swivel joints 15, 16, which steering levers 6 correct the steering of the wheels 4 supported by the axle.

The distance between the pivot 13 on which the turret 12 is mounted and the swivel joints 15, 16 by which this turret 12 is connected to the coupling bars 17 is such that the turret 12 oscillates through an angle less than that of the steering average of the wheels 4 supported by the axle 1.

The symmetry axis of the axle 1, perpendicular to the longitudinal axis of the axle 1, directed thus approaches the rail 8. Consequently, the angle of rotation of the turret 12 decreases until there is auto-stabilization of the rotations and concurrent evolution of the above-mentioned symmetry axis of the axle 1 and of the rail 8.

The freedom of horizontal pivoting of the rear roller 7' allows slight transverse digressions of the axle 1 with respect to the trajectory of the rail 8, while allowing the roller 7' to remain engaged on this rail.

The support arm 10' which has a horizontal pivoting freedom only strikes the stops 22 in the case of an abnormal drift or slip of said axle 1. The two rollers 7, 7' then have to retain the axle 1 transversely with respect to the provided trajectory thereof and to prevent any additional sideways sliding of the vehicle.

A slight incline of the pivot 20' of the crossbar 19' with respect to the vertical plane is to slightly incline the roller 7' on the rail 8 in order to compensate for any transverse leaning effect of the axle 1. This incline of the roller 7' ensures optimum hook engagement of this roller 7' on the rail 8.

As indicated above, each roller 7, 7' has a core 28 inserted between two possibly conical flanges 29, 30, the shape of this core being, for example, substantially cylindrical to slightly bi-truncated cone shaped, notably in a twin assembly.

The complementary projection 32 is intended to engage in the peripheral groove 31 and it extends along the sections of the rail 8 where the vehicle is to circulate on its own site. This projection 32 of the rail 8 and the groove 31 of the core 28 of the rollers 7, 7' ensure a guidance reliability additional to that which is already ensured by the rail 8 and the flanges 29 and 30 of the rollers 7, 7'. This projection 32 also has the advantage of practically eliminating any risk of derailment of the rollers 7, 7', since it cannot be obstructed by any object which is deposited on the track.

If the vehicle is moved by electric traction, the rollers 7, 7' are to ensure the return of the electrical current which is collected, for example by a pantograph on a single wire. The return of the current is thus ensured by a rolling movement and not by friction, any problem of shoe wear thus being avoided.

Figure 5:
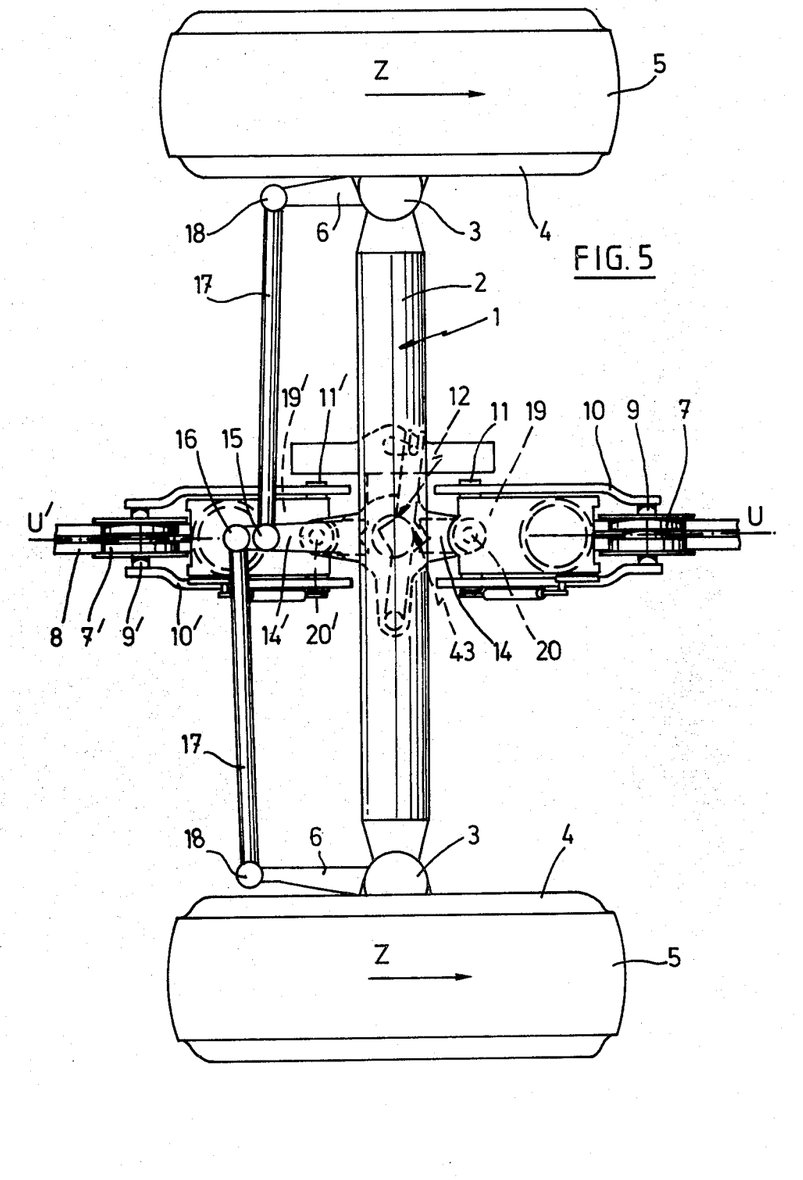
FIG. 5 is a view similar to that of FIG. 1, illustrating an automatic, bi-directional guiding system according to the present invention.
Figure 6:
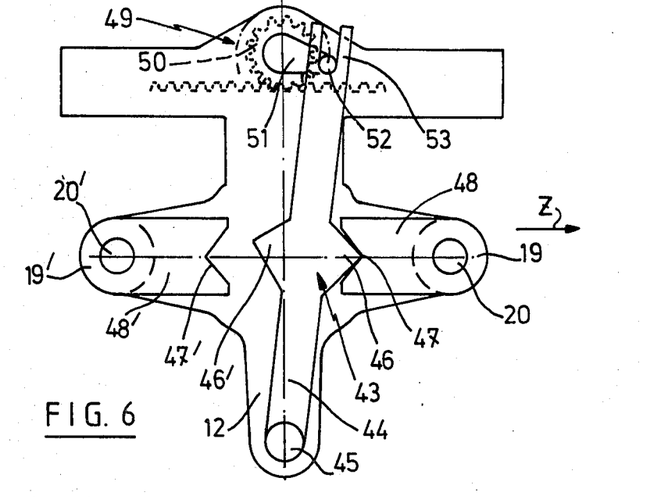
FIG. 6 is, on an enlarged scale, a partial bottom plan view of the bi-directional guiding system according to FIG. 5.
Figure 7:
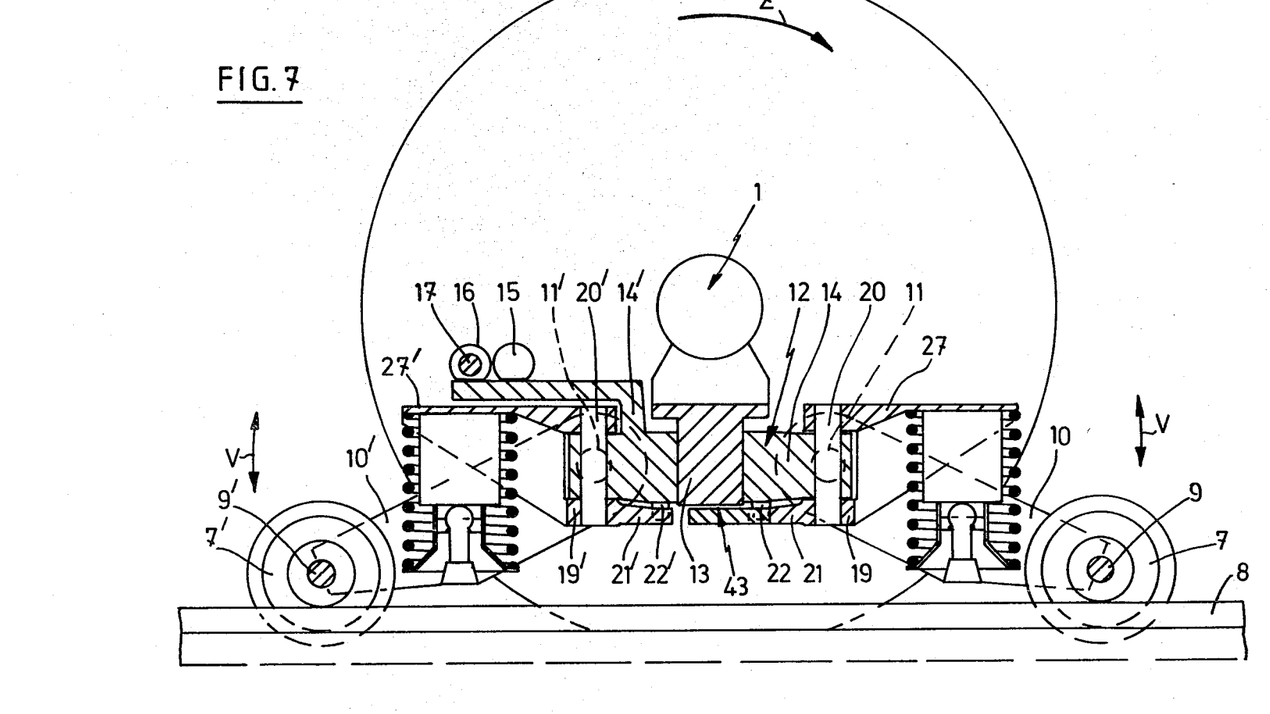
FIG. 7 is a view similar to that of FIG. 2 of the automatic, bi-directional guiding system of FIG. 5.

FIGS. 5 to 7 illustrate a steering axle 1 on which an automatic, bi-directional guiding system is mounted. This system, like the unidirectional guiding system, comprises the rollers 7, 7' which are to be engaged in a rail 8. These rollers 7, 7' are mounted on shafts 9, 9' which are supported by support arms 10, 10'.

However, the bi-directional system differs from the unidirectional system illustrated in FIGS. 1 to 3 in that the support arms 10, 10' are fastened to the turret 12 so that they may both oscillate vertically and pivot horizontally independently of the turret 12 to a predetermined extent.

For this purpose, the turret 12 comprises extensions 14, 14' on each side corresponding to the possible opposite directions of movement of the vehicle. Crossbars 19, 19' are fastened to these extensions 14, 14' by substantially vertical pivots 20, 20', the support arms 10, 10' being suspended from these crossbars by substantially horizontal pivots 11, 11'.

These support arms 10, 10' extend in the two possible directions of movement of the vehicle. They may oscillate vertically according to the arrows V about the substantially horizontal pivots 11, 11'. The horizontal pivoting movement of the crossbars 19, 19' and of the support arms 10, 10' is restricted by lower appendages 21, 21' which are presented by the crossbars 19, 19' between the stops 22, 22' supported by the turret 12.

In FIGS. 5 to 7, the suspension of the support arms 10, 10' is produced in the same manner as in the embodiment of the unidirectional system illustrated in FIGS. 1 to 3. The raising means and the positioning thereof are also the same.

One of the extensions 14, 14', for example extension 14' supports swivel joints 15, 16 which connect it to the coupling bars 17 which are hinged at 18 to the steering lever 6 of each wheel 4.

As in the embodiment of the unidirectional system illustrated in FIG. 1, the distance between the pivot 13 on which the turret 12 is mounted and the swivel joints 15, 16 is such that this turret 12 oscillates through an angle less than that of the steering average of the two wheels 4 supported by the axle 1.

As may be seen in FIGS. 5 and 6, a device for reversing the direction of movement, designated as a whole by reference numeral 43 and being able to prevent one of the two support arms 10, 10' respectively carrying the first and second rollers 7, 7' from pivoting horizontally with respect to the turret 12, comprises a reversing lever 44 oscillating at one end on a trunnion 45 supported by the turret 12 and provided on each side with a boss 46, 46' which is capable of engaging in a seat 47, 47' made in an extension 48, 48', possibly merged with the lower appendages 21, 21' of the crossbar 19, 19'.

The reversing lever 44 is operated by a hydromechanical rack device which is designated as a whole by reference numeral 49 and which comprises a pinion 50 which is fixed to one end of a crank 51, the other end of which supports a spindle 52 guided in a fork 53 made in the end of the lever 44, opposite the end carrying the trunnion 45 of this lever 44.

The direction of movement of the vehicle is selected by the reversing device 43. For example, for the direction of movement Z, this lever 43 connects the front support arm 10 of the turret 12, but it still allows a certain freedom of horizontal pivoting movement of the rear support arm 10'.

The operation of the automatic, bi-directional guiding system which is illustrated in FIGS. 5 to 7 is similar in all aspects to that of the automatic, unidirectional guiding system illustrated in FIGS. 1 to 3.

In practice, the unidirectional version is preferred for a two-axle vehicle which only comprises automatic guidance at the front axle, while the bi-directional version is preferred for rigid, two-axle vehicles and for articulated vehicles which have at least three axles, provided with automatic guidance at each axle.

Figure 8:
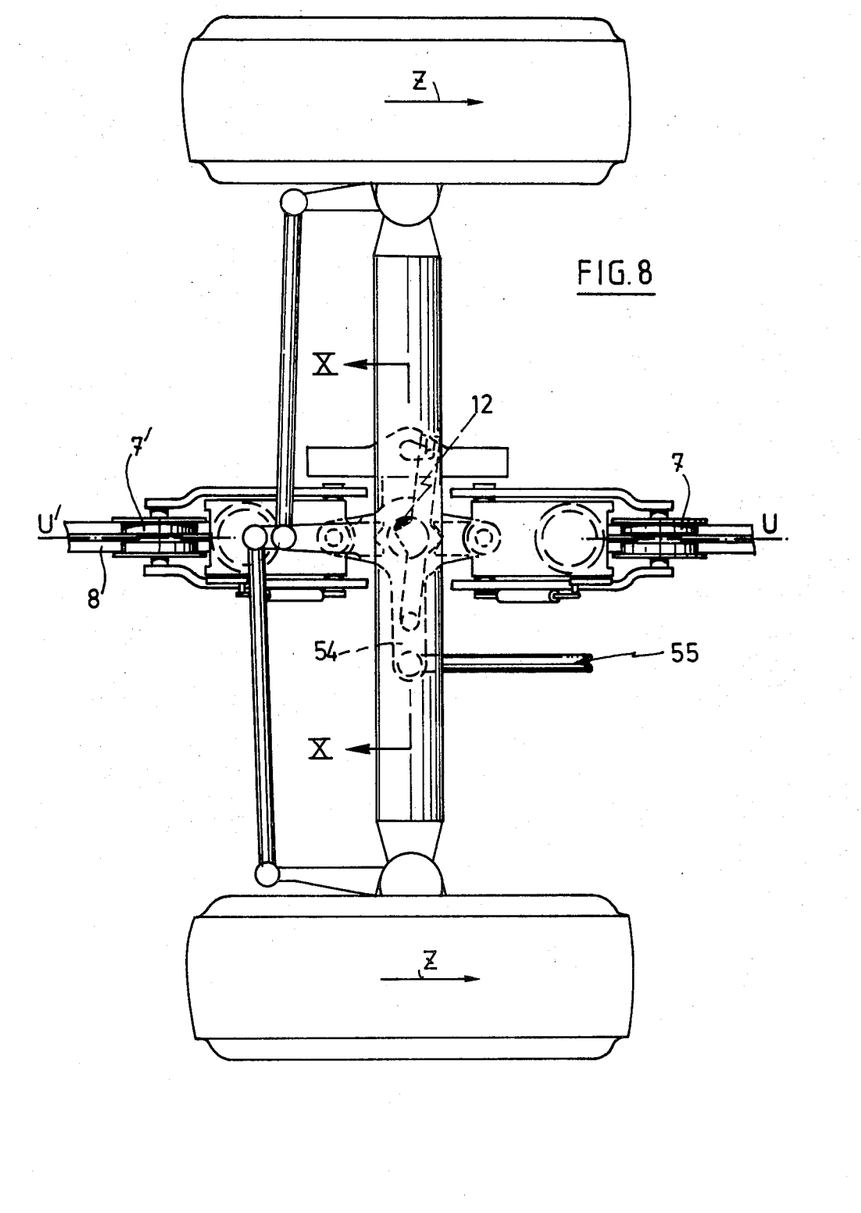
FIGS. 8 and 9 are views similar to those of FIGS. 1 and 5, each illustrating a guiding device other than the single rail, this guiding device being provided with a clutch allowing a bimodal use of the vehicle.

In FIG. 8, the turret 12 comprises a steering arm 54 which is to be controlled by a guiding device other than the rail 8, illustrated at 55.

This device for guiding 55 other than by the rail is intended to allow the vehicle to move autonomously after the rollers 7, 7' have been raised.

Figure 9:
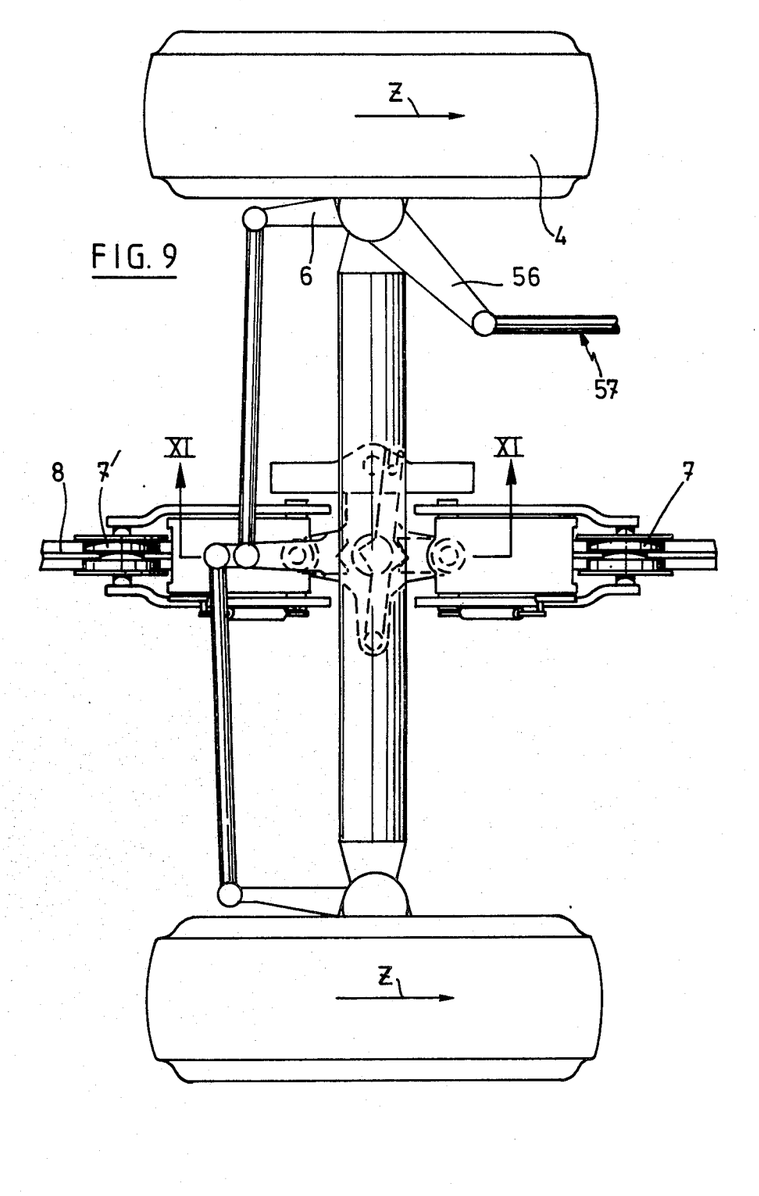

In FIG. 9, one of the steering levers 6 of the wheels 4 comprises an extension 56 which is to be controlled by a guiding device 57 which is different from the rail 8.

This device 57 allows the vehicle to move autonomously after the rollers 7, 7' have been raised.

Figure 10:
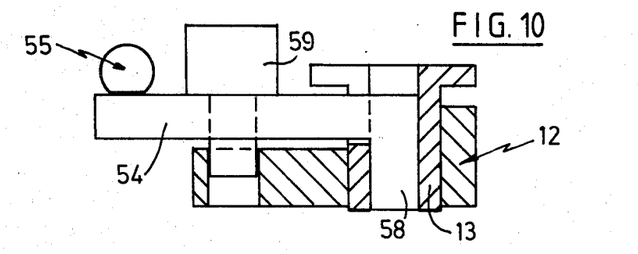
FIG. 10 schematically illustrates in partial section along line X—X of FIG. 8, a guiding device which is different from the rail and is to be associated by a coupling device with a steering arm of the turret which is provided with the guiding system.

FIG. 10 schematically illustrates a guiding device 55, other than by the rail 8, which is associated with the steering arm 54. The latter is mounted on a vertical pivot 58 which is concentric to the pivot 13, around which the turret 12 may pivot, a coupling device 59 being associated with the steering arm 54 to connect it to the turret 12 for guidance other than by the rail 8 or to disconnect it for automatic guidance.

Figure 11:
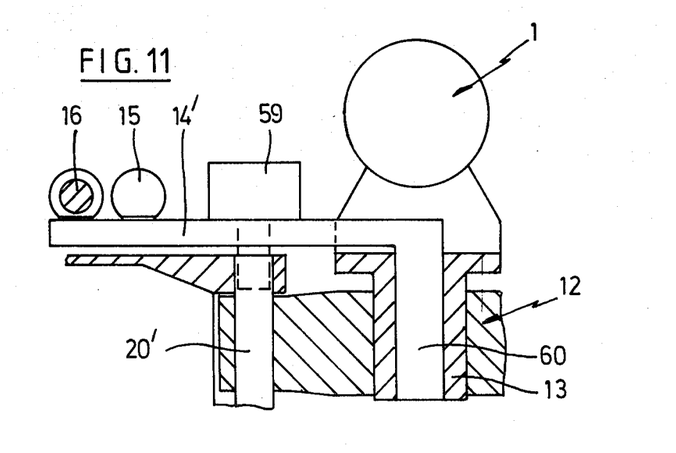
FIG. 11 schematically illustrates in partial section along line XI—XI of FIG. 9, means for disconnecting the automatic guiding system of a steering axle, when the vehicle is driven manually thereby.

In FIG. 11 illustrates a device for disconnecting the automatic guiding system for manual driving, for example. The extension 14' of the turret 12 supporting the swivel joints 15, 16 is supported, at one end by a vertical pivot 60 which is concentric to the pivot 13 supporting the turret 12 and may be disconnected, for guidance other than by the rail 8, or it may be connected, for automatic guidance of the turret 12 of the vertical pivot 20 or 20', by a coupling device 59 associated with the extension 14'.

Figure 12:
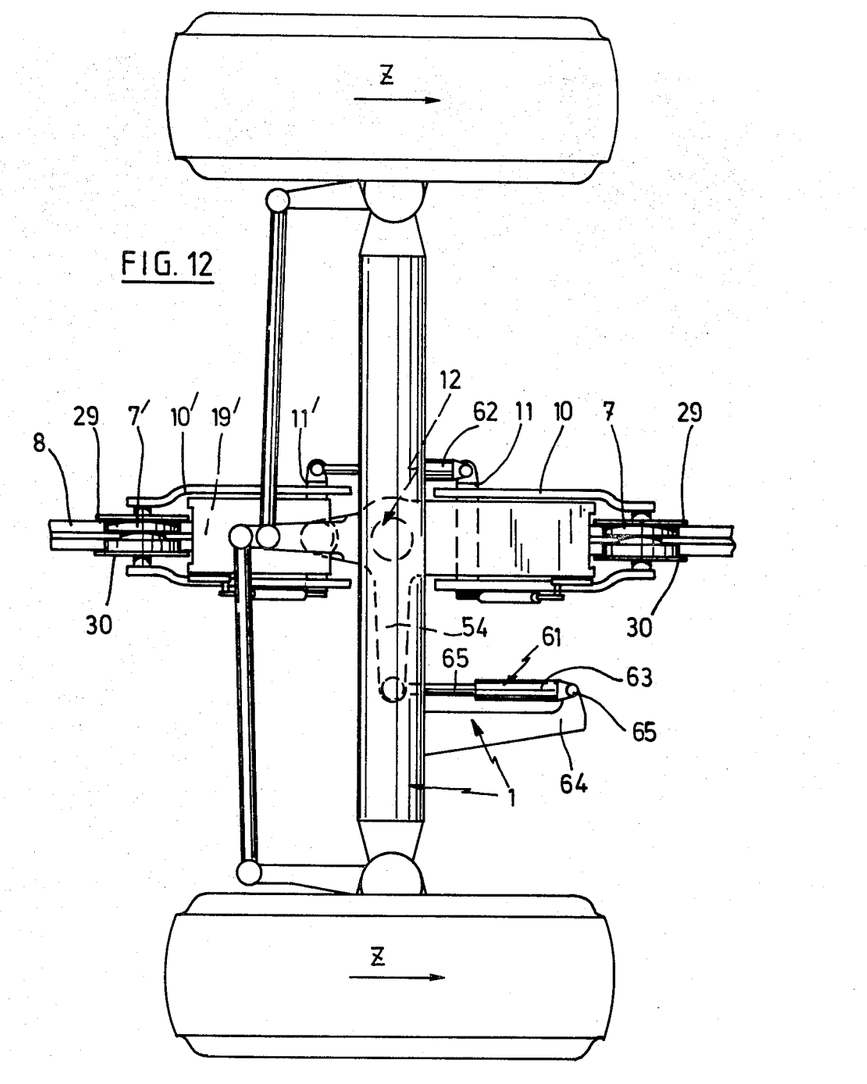
FIG. 12 is a partial plan view of a variant of the automatic guiding system of FIGS. 1 and 5 comprising a device which allows the controlled crossing of static switches.

A variant of the automatic, unidirectional or bi-directional guiding system of FIGS. 1 to 3 and 5 to 7 which allows the path to be followed to be selected in a static divergent switch is illustrated in FIG. 12.

This variant comprises in addition to the unidirectional guiding system illustrated in FIGS. 1 to 3 or bi-directional system illustrated in FIGS. 5 to 7, two double-action jacks 61 and 62. The first jack 61 acts on the steering arm 54 of the turret 12 in order to press against the rail 8 one of the flanges 29, 30 of the roller 7 supported by the support arm 10 extending in the direction of movement of the vehicle. This first jack comprises a cylinder 63 which is hinged to a support 64 attached to the axle 1 and a piston 65 hinged to the steering arm 54 of the turret 12. The second double-action jack 62 which is to orientate the crossbar 19' supporting the support arm 10' of the other roller 7', oriented in the direction opposite that indicated by arrow Z, connects the horizontal pivots 11, 11' supporting the support arms 10, 10' of the rollers 7, 7'. These jacks 61 and 62 act in order to selectively press the flanges 29, 30 of each roller 7, 7' against the rail 8, these flanges being positioned on opposite sides of the rail. Consequently, the rollers 7, 7' select the face of the guiding rail 8 to be followed and thus the branch to be followed in a static divergent switch.

Figure 13:
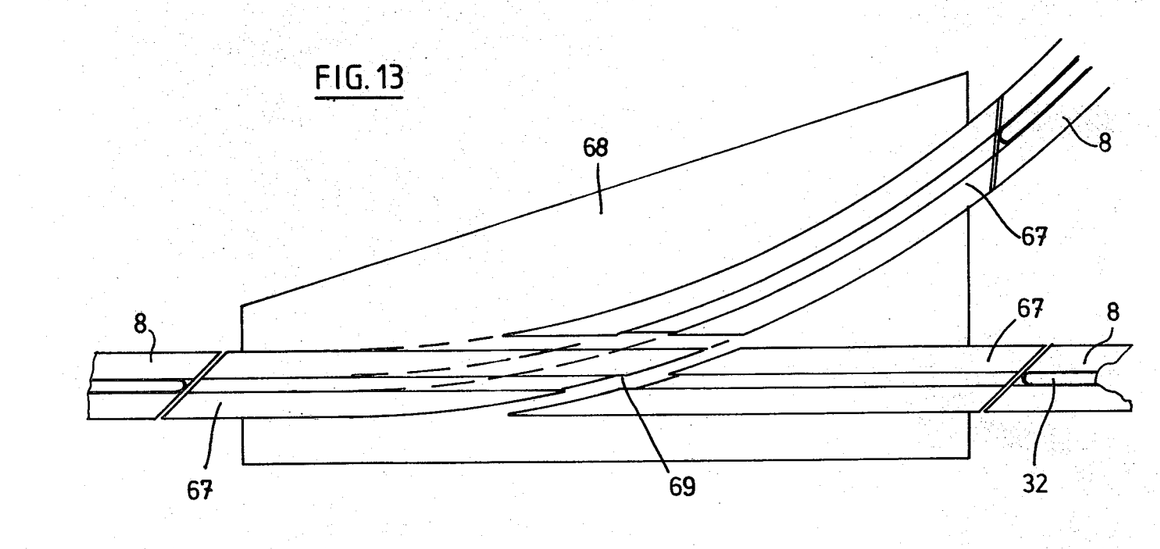
FIG. 13 is a plan view of a static switch formed by sections of rail similar to that shown in FIG. 4.

FIG. 13 illustrates such a left-hand switch for dividing into two, composed of sections 67 of a rail similar to that illustrated in FIG. 4. This switch comprises a frame 68 on which rail sections 67 are attached, the ends of which adjacent to a dividing zone 69 are profiled in order to allow the flanges 29, 30 of each roller 7, 7' to cross the switch.

In the dividing zone 69, the projection 32 of the rail 8 which is to engage in the groove of each roller 7, 7' is interrupted so that it does not hinder the crossing of the switch.

Figure 14:
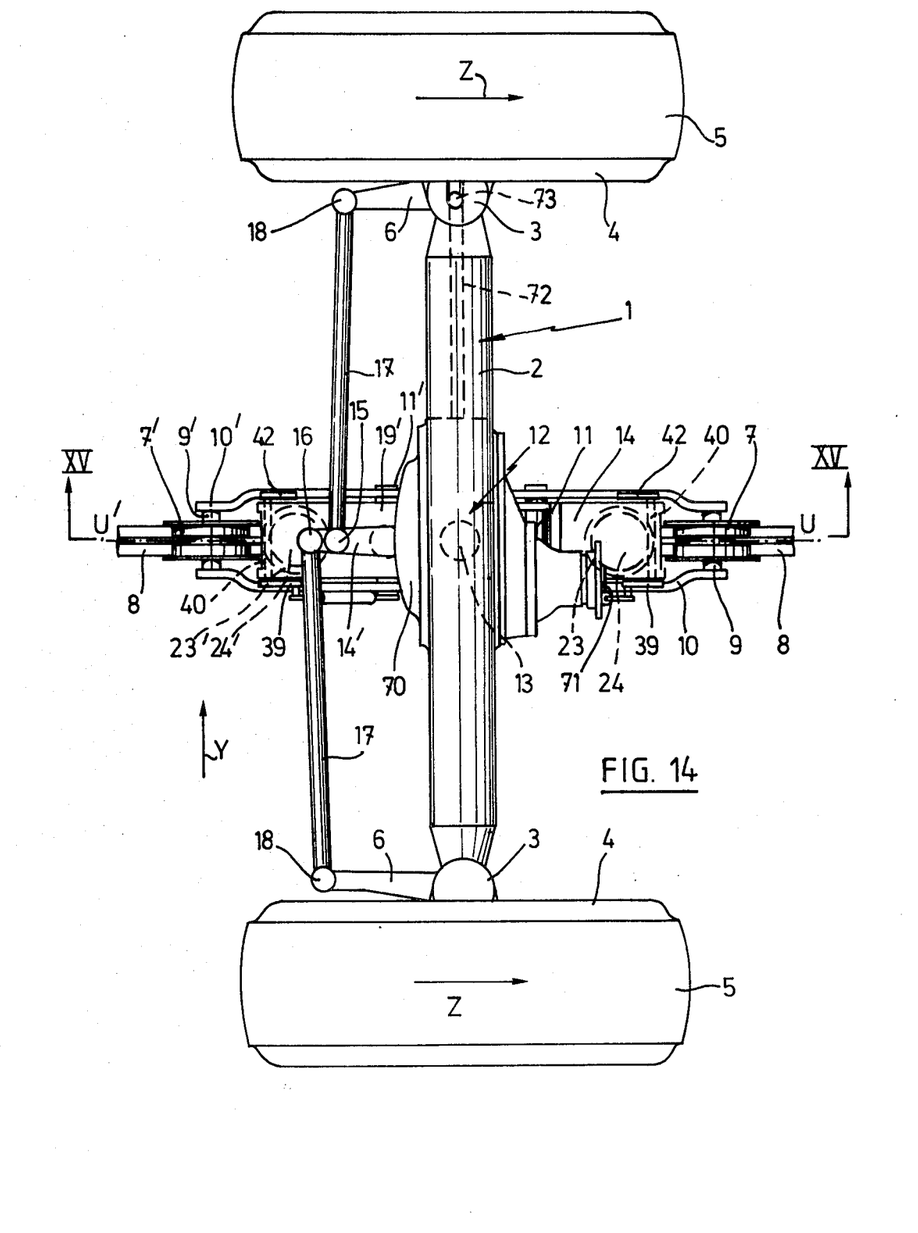
FIG. 14 is a view similar to FIG. 1 and illustrates a steering axle with driving wheels.
Figure 15:
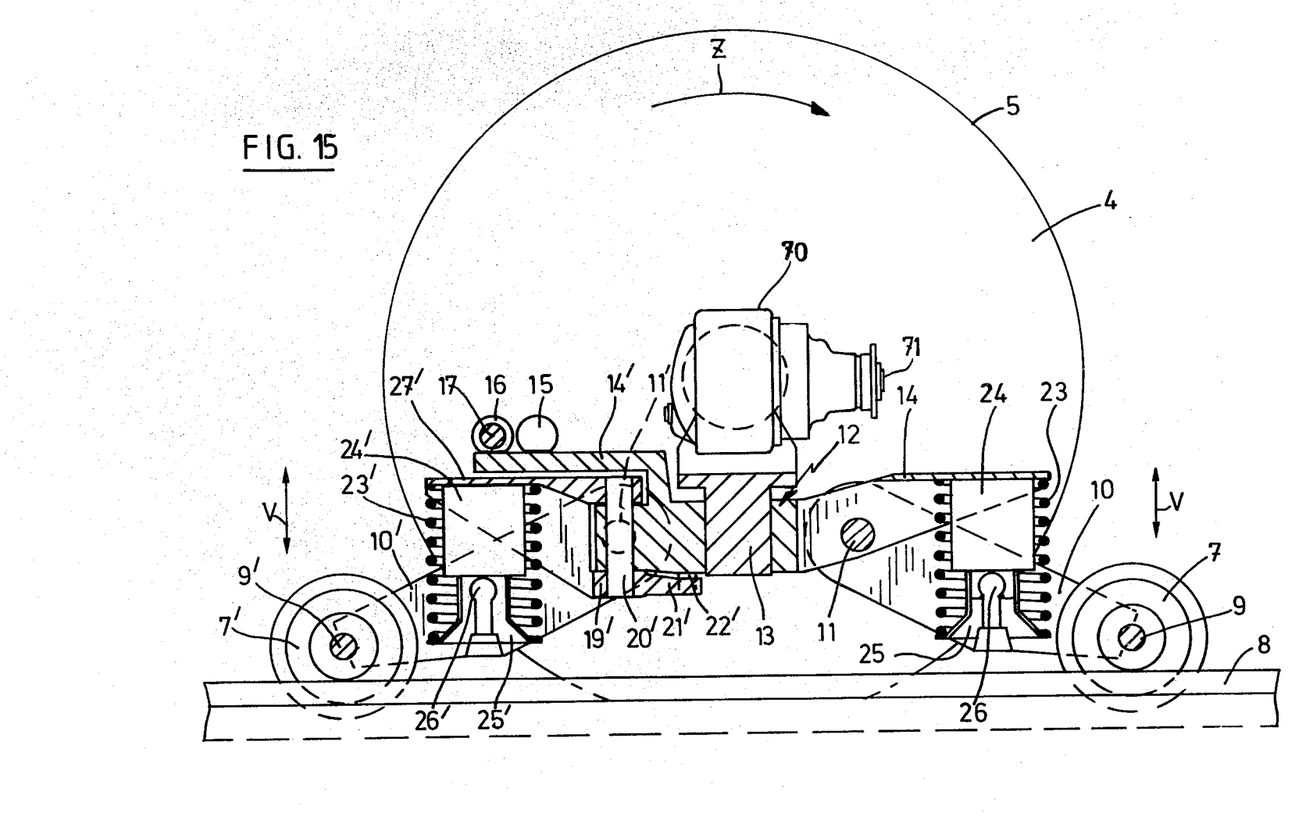
FIG. 15 is a view similar to FIG. 2 along line XV—XV of FIG. 14.

As illustrated in FIGS. 14 and 15, the wheels having pneumatic tires on a steering axle equipped with a guiding system according to the present invention may be provided as driving wheels.

To this end, a differential 70, connected to a driving shaft 71 transmits the driving stress to a wheel shaft 72, connected to the driving wheel 4, by a cardan 73.

It is clear that the present invention is not restricted to the details described above in order to produce the automatic guiding system, and that numerous modifications may be applied to these details without leaving the frame of the invention.

Figure 16:
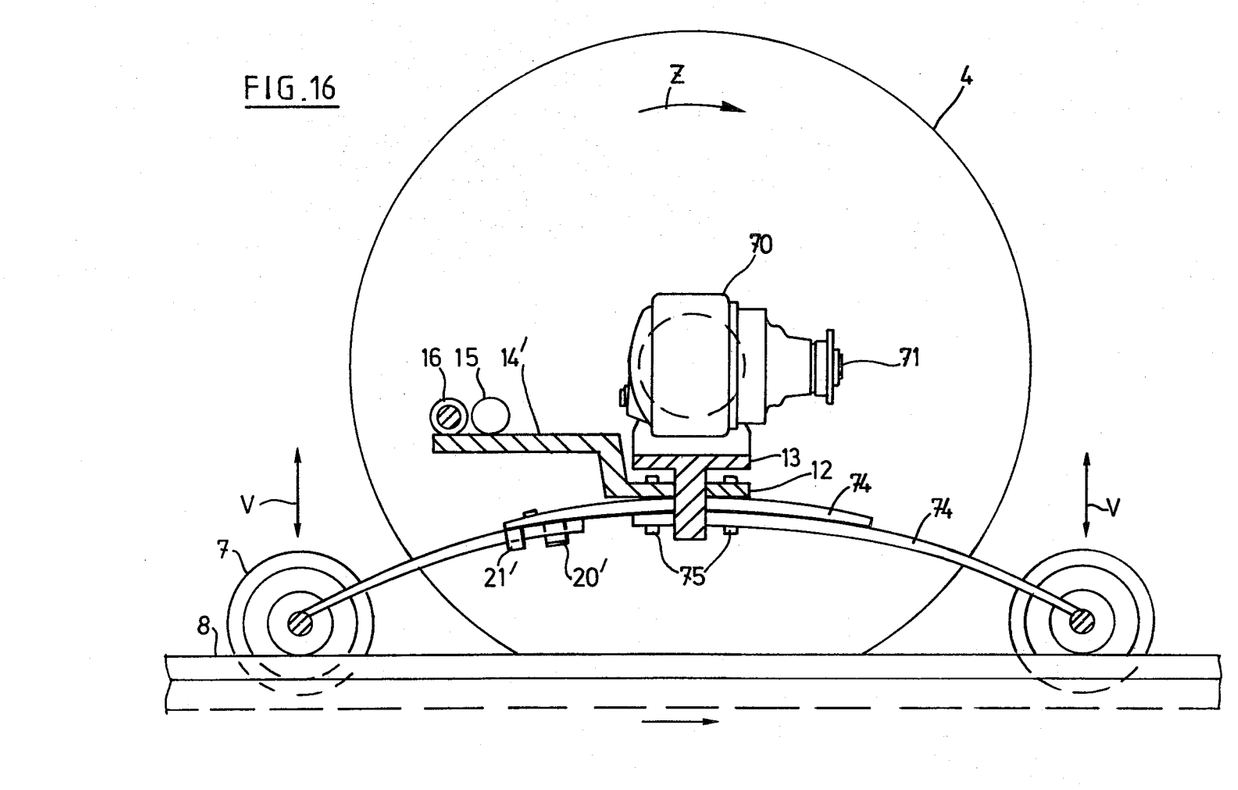
FIG. 16 is a side elevation view of a steering axle for wheels having pneumatic tires, provided with an automatic, unidirectional guiding system comprising arms which have a certain flexibility in the vertical plane.

Thus, the system may comprise arms capable of oscillating vertically due to their flexibility in the vertical plane. Such arms comprise, for example, leaf springs 74 and are attached to the turret 12 by bolts 75, as illustrated in FIG. 16.

The guiding system according to the present invention may equip not only the front axle of a rigid vehicle, but also the rear axle of this vehicle. It may also independently equip several or all the axles of an articulated vehicle, regardless of whether these axles are mounted on a ball circle or whether they comprise axle journals of the wheels.

The automatic guiding system according to the present invention has notably the following advantages:
the guiding system may either be mounted on the front axle, or on all the axles of the vehicle;
an assembly of the system according to the present invention on all the axles allows the drag of the vehicle to be reduced, because all the axles follow the same track in automatic guidance;
the system may either be unidirectional or bi-directional;
the guiding rail may either be installed on an open site, or on its own site;
the system allows crossings and switches as much as on an open site as on a private site;
the rollers ensure the return of the electric current by rolling and not by friction;
when the guiding system is also used for ensuring the return of electrical current, it allows this current to be collected on a single aerial wire by a pantograph, which avoids the necessity of providing mobile aerial switches and automatic devices for repositioning current collection trolleys;
the aerial connection of electrical current and the return of this current to the soil in the automatic guiding system according to the present invention simplifies the answer to the problems of electrical insulation;
the rollers may be raised when the vehicle is to move autonomously on a road site;
the rollers are firmly applied on the rail by a double suspension which makes the guidance reliable, whatever the useful load of the vehicle;
the transverse strains are primarily absorbed by the wheels having pneumatic tires;
the rollers allow the axle to be retained in the event of a sideways slip;
the disengagement of the guiding system provides the advantage of allowing greater steering of the wheels in manual driving; and
the vehicles provided with the automatic guiding system according to the present invention which is installed on all the axles may be coupled in trains.

We claim:

1. A system for automatically guiding a vehicle, provided with at least one steering axle (2) supporting wheels (4) having pneumatic tires (5), comprising: a first roller (7) for following a rail (8) extending in the direction of movement of the vehicle, a first support arm (10) mounting said first roller and extending in the direction of movement of the vehicle with respect to the steering axle, a turret (12) mounted on a substantially vertical pivot (13) supported by said steering axle, first horizontal axle means (11) mounting said first support arm to said turret for vertical oscillation, at least one coupling bar (17) hinged at one end to a steering lever (6) of one of the wheels and at the other end to an extension (14') of said turret, a second roller (7') for following the rail, a second support arm (10') mounting said second roller and extending in a direction opposite the direction of movement of the vehicle with respect to the steering axle, a crossbar (19'), second horizontal axle means (11') mounting said second support arm to said crossbar for vertical oscillation, vertical axle means (20') mounting said crossbar to said turret whereby said second support arm may pivot horizontally, and limit stop means (21', 22') operatively associated with said crossbar and turret for restricting the extent of said horizontal pivoting.

2. A system according to claim 1, further comprising a further crossbar (19) and vertical axle means (20) mounting the first support arm for horizontal pivoting independently of the turret, to a predetermined extent, and means (43) for selectively preventing one of the two support arms from pivoting horizontally.

3. A system according to claim 2, in which the means for preventing comprises a reversing lever (44) hinged at one end to a trunnion (45) supported by the turret, a pair of bosses (46, 46') on opposite sides of the reversing lever, a pair of seats (47, 47') in extensions of the crossbars for individually engaging the bosses and reciprocating motion means (49) for operating the reversing lever to bring one of the bosses into a corresponding seat of a crossbar extension and to disengage the other boss.

4. A system according to claim 3, in which the reciprocating motion means comprises a rack, a cooperating pinion (50) fixed at one end of a crank (51), and a spindle (52) on the other end of the crank guided in a fork (53) in an end of said reversing lever opposite the trunnion.

5. A system according to claim 1, further comprising a suspension system for maintaining each roller in contact with the rail.

6. A system according to claim 5, in which the suspension system comprises two separate suspension elements, each capable of separately maintaining the rollers in contact with the rail.

7. A system according to claim 5, in which the suspension system comprises a helical spring (23) and a coaxial pneumatic device (24).

8. A system according to claim 5, in which the first roller is maintained in contact with the rail by a suspension system comprising a helical spring resting at one end on an extension (14) of the turret and at the other end on a shoulder (25) supported by an articulation device (26) fixed to the support arm, and a pneumatic device also resting on the extension of the turret and on the shoulder.

9. A system according to claim 5, in which the second roller is maintained in contact with the rail by a suspension system comprising a helical spring resting at one end on an extension (27') of the crossbar and at the other end on a shoulder (25') supported by an articulation device (26') fixed to the second support arm, and a pneumatic device also resting on said extension of the crossbar and on the shoulder.

10. A system according to claim 1, further comprising means for raising the support arms of the rollers.

11. A system according to claim 10, in which the means for raising the each of said first and second support arms of the rollers comprises a double-action lifting jack (35) including a cylinder (36) mounted on a horizontal axle of a support arm and a piston (37), hinged to one end of a lever (39), the opposite end of said lever being hinged to the extension of the turret, and a cable attached at opposite ends to said support arm and to said lever.

12. A system according to claim 1, wherein each roller comprises a core (28) having a centered peripheral groove (31) therein, and the rail having a centered projection (32) for engaging the peripheral groove.

13. A system according to claim 1, further comprising a manual guiding device for controlling the orientation of the wheels of the vehicle.

14. A system according to claim 13, in which the manual guiding device comprises a coupling device (59) for operatively connecting or disconnecting said manual guiding device from the turret.

15. A system according to claim 1, further comprising means (61, 62) for selectively laterally biasing the rollers.

16. A system according to claim 1, in which each of the support arms is flexible.

17. A system according to claim 16, in which each flexible support arms comprises leaf springs.

* * * * *